US012421391B2

United States Patent
Tai et al.

(10) Patent No.: US 12,421,391 B2
(45) Date of Patent: Sep. 23, 2025

(54) POLYETHER BASED WATERBORNE POLYURETHANE DISPERSION AND METHOD FOR PREPARING THE SAME

(71) Applicant: Dow Global Technologies LLC, Midland, MI (US)

(72) Inventors: Xiangyang Tai, Shanghai (CN); Qing Zhu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 706 days.

(21) Appl. No.: 17/597,738

(22) PCT Filed: Aug. 22, 2019

(86) PCT No.: PCT/CN2019/101882
§ 371 (c)(1),
(2) Date: Jan. 21, 2022

(87) PCT Pub. No.: WO2021/031174
PCT Pub. Date: Feb. 25, 2021

(65) Prior Publication Data
US 2022/0259428 A1 Aug. 18, 2022

(51) Int. Cl.
*C08G 18/32* (2006.01)
*C08G 18/08* (2006.01)
*C08G 18/12* (2006.01)
*C08G 18/24* (2006.01)
*C08G 18/48* (2006.01)
*C08G 18/75* (2006.01)
*C08G 18/76* (2006.01)
*C08L 75/08* (2006.01)

(52) U.S. Cl.
CPC .......... *C08L 75/08* (2013.01); *C08G 18/0866* (2013.01); *C08G 18/12* (2013.01); *C08G 18/24* (2013.01); *C08G 18/3246* (2013.01); *C08G 18/4804* (2013.01); *C08G 18/4833* (2013.01); *C08G 18/755* (2013.01); *C08G 18/7671* (2013.01); *C08L 2201/50* (2013.01)

(58) Field of Classification Search
CPC ..... C08L 75/08; C08G 18/0886; C08G 18/12; C08G 18/3246; C08G 18/4804; C08G 18/4833; C08G 18/755

USPC ........................................................ 524/591
See application file for complete search history.

(56) References Cited

U.S. PATENT DOCUMENTS

| | | | |
|---|---|---|---|
| 4,861,825 | A | 8/1989 | Ernst et al. |
| 6,087,440 | A | 7/2000 | Skaggs et al. |
| 6,127,508 | A | 10/2000 | Corley et al. |
| 10,807,400 | B2 | 10/2020 | Yoshimoto et al. |
| 2003/0087567 | A1 | 5/2003 | Moore |
| 2004/0109992 | A1 | 6/2004 | Gribble et al. |
| 2006/0058453 | A1 | 3/2006 | Argyropoulos et al. |
| 2006/0116454 | A1 | 6/2006 | Erdem et al. |
| 2007/0208133 | A1 | 9/2007 | Stollmaier et al. |
| 2008/0081847 | A1 | 4/2008 | Sasaki et al. |
| 2010/0119775 | A1 | 5/2010 | Bustos et al. |
| 2010/0273939 | A1 | 10/2010 | Stollmaier et al. |
| 2020/0024474 | A1* | 1/2020 | Van Casteren ......... C08L 75/16 |

FOREIGN PATENT DOCUMENTS

| | | |
|---|---|---|
| CA | 2504147 C | 8/2012 |
| CN | 1330669 A | 1/2002 |
| CN | 101283014 A | 10/2008 |
| CN | 101497687 A | 8/2009 |
| CN | 101885826 A | 11/2010 |
| CN | 101959914 A | 1/2011 |
| CN | 103320084 A | 9/2013 |
| CN | 105367743 A | 3/2016 |
| CN | 108139669 A | 6/2018 |
| CN | 109321082 A | 2/2019 |
| EP | 1572771 | 6/2012 |
| JP | 7138469 | 5/1995 |
| WO | 2006086092 | 8/2006 |
| WO | 2011163250 A1 | 12/2011 |

OTHER PUBLICATIONS

Office Action from corresponding Japanese Patent Application: 2022-509703 with a mailing date of Jul. 26, 2023.
Office Action from corresponding 201980099472.8 Chinese application, dated Jun. 25, 2023.
Extended European Search Report 19942516.6 with a mailing date of Apr. 13, 2023.

* cited by examiner

*Primary Examiner* — Ruiyun Zhang

(57) ABSTRACT

A waterborne polyurethane dispersion is provided. The waterborne polyurethane dispersion is prepared in the presence of a chain extender N-aminoethylpiperazine (AEP) and exhibits good modulus while retaining limited solubility.

12 Claims, No Drawings

POLYETHER BASED WATERBORNE POLYURETHANE DISPERSION AND METHOD FOR PREPARING THE SAME

FIELD OF THE INVENTION

The present disclosure relates to a polyether based waterborne polyurethane dispersion and a method for preparing the same.

INTRODUCTION

Solvent borne polyurethane has been dominating applications like coatings, adhesives, binders and synthetic leathers for decades of years. It is gradually replaced by water borne polyurethane dispersion (PUD) to reduce solvent deliverable to atmosphere and hazard to operators and end users. Most PUDs, like their solvent borne counterpart, use polyester polyol as a backbone rather than polyether, since the former could afford higher modulus and strength due to stronger polar-polar interaction between ester-bone polymer segments. On the other hand, ester bond is weaker than ether bond to hydrolysis, making PUD water hydrolysis stability very challenging. Polyether based PUD is more preferred from hydrolysis resistance point of view. Besides, since polyether polyol has lower cost, and lower viscosity than the polyester counterpart, it is preferred from economics and process considerations. Penetration of polyether based polyurethane into PUD for various applications is slow, however, because it could not mechanically perform similarly to polyester based PUD. Therefore, it needs creative technology to increase mechanical performance of polyether based PUD.

Through persistent explorations, we have surprisingly found that by using N-aminoethylpiperazine (AEP) as a chain extender in the synthesis of polyether based PUD, mechanical performance could be greatly improved. It is surprisingly found that AEP can give PUD 2 or 3 times modulus of other diamines. Such high modulus is very critical for polyether PUD to penetrate into applications dominated by polyester PUD. As polyether PUD intrinsically has superior hydrolysis stability to polyester PUD, this novel finding paves the way for commercial offering of hydrolysis-resistant PUDs.

SUMMARY OF THE INVENTION

The present disclosure provides a unique waterborne polyurethane dispersion and a method for preparing the same.

In a first aspect of the present disclosure, the present disclosure provides a waterborne polyurethane dispersion comprising polyurethane particles dispersed in water, wherein the waterborne polyurethane dispersion is derived from a system comprising:
(A) an isocyanate component comprising one or more compounds having at least two isocyanate groups;
(B) a polyether polyol component having an EO content of less than 80 wt % based on the total weight of the polyether polyol;
(C) optionally, a component selected from the group consisting of methoxy poly(ethylene glycol) with Mw ranging from 350-3000, poly(ethylene glycol) with Mw ranging from 350~3000, and low Mw diol with Mw ranging from 62 to 500;
(D) optionally, a catalyst;
(E) optionally, a hydrophilic amino siloxane compound represented Formula I:

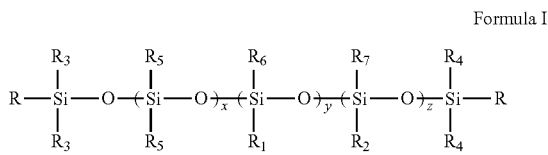

Formula I wherein each R independently represents methyl, ethyl, n-propyl, i-propyl, n-butyl, i-butyl, sec-butyl, t-butyl, n-pentyl, i-pentyl, tert-pentyl, neo-pentyl, cyclohexyl, phenyl, vinyl, allyl or $-(OCH_2CH_2)_a-O-CH_2-CH=CH_2$;
$R_1$ is $-(CH_2)_mNH_2$ or $-(CH_2)_s-NH-(CH_2)_tNH_2$;
$R_2$ is $-CH_2CH_2CH_2O(CH_2CH_2O)_nH$; and
each of $R_3$, $R_4$, $R_5$, $R_6$ and $R_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl and phenyl;
wherein a is an integer of 1 to 10; x is an integer of 20-500; y is an integer of 1-10; z is an integer of 1-10; m is an integer of 1-5; s is an integer of 1, 2, 3, 4 or 5; t is an integer of 1, 2, 3 or 5; and n is an integer of 5-20;
(F) a surfactant;
(G) a chain extender N-aminoethylpiperazine; and
(H) water.

In a second aspect of the present disclosure, the present disclosure provides a method for producing the waterborne polyurethane dispersion of the first aspect, comprising (i) reacting the isocyanate component (A) with the polyether polyol component (B) and the optional component (C) optionally in the presence of the catalyst (D) to form a prepolymer; (ii) dispersing the prepolymer in water (H) in the presence of the surfactant (F) to form an emulsion; and (iii) adding optionally the hydrophilic amino siloxane compound (E) and the chain extender N-aminoethylpiperazine (G) to the emulsion to form the waterborne polyurethane dispersion.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components by a physical means.

As disclosed herein, "and/or" means "and, or as an alternative". All ranges include endpoints unless otherwise indicated.

The Isocyanate Component (A)

In various embodiments, the isocyanate component (A) has an average functionality of at least about 2.0, preferably from about 2 to 10, more preferably from about 2 to about 8, and most preferably from about 2 to about 6. In some embodiments, the isocyanate component includes a polyisocyanate compound comprising at least two isocyanate groups. Suitable polyisocyanate compounds include aromatic, aliphatic, cycloaliphatic and araliphatic polyisocyanates having two or more isocyanate groups. In a preferable embodiment, the polyisocyanate component comprises polyisocyanate compounds selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another preferable embodiment, suitable polyisocyanate compounds include m-phenylene diisocyanate, 2,4-toluene diisocyanate and/or 2,6-toluene diisocyanate (TDI), the various isomers of diphenylmethanediisocyanate (MDI), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof.

Alternatively or additionally, the polyisocyanate component may also comprise a isocyanate prepolymer having an isocyanate functionality in the range of 2 to 10, preferably from 2 to 8, more preferably from 2 to 6. The isocyanate prepolymer can be obtained by reacting one or more polyisocyanates stated above with one or more isocyanate-reactive components selected from the group consisting of C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000, polyetherdiols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, and a combination thereof, with the proviso that the isocyanate prepolymer comprises at least two free isocyanate terminal groups; preferably by reacting the above stated monomeric isocyanate components with one or more isocyanate-reactive compounds selected from the group consisting of ethylene glycol, 1,2-propanediol, 1,3-propanediol, 1,3-butanediol, 1,4-butenediol, 1,4-butynediol, 1,5-pentanediol, neopentyl- glycol, bis(hydroxy-methyl)cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols. Suitable prepolymers for use as the polyisocyanate component are prepolymers having NCO group contents of from 2 to 40 weight percent, more preferably from 4 to 30 weight percent. These prepolymers are preferably prepared by reaction of the di— and/or poly-isocyanates with materials including lower molecular weight diols and triols. Individual examples are aromatic polyisocyanates containing urethane groups, preferably having NCO contents of from 5 to 40 weight percent, more preferably 20 to 35 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 800. These polyols can be employed individually or in mixtures as di— and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkane diols such as butane diol. Other diols also useful include bishydroxyethyl— or bishydroxypropyl-bisphenol A, cyclohexane dimethanol, and bishydroxyethyl hydroquinone.

Also advantageously used for the isocyanate component are the so-called modified multifunctional isocyanates, that is, products which are obtained through chemical reactions of the above isocyanates compounds. Exemplary are polyisocyanates containing esters, ureas, biurets, allophanates and preferably carbodiimides and/or uretoneimines. Liquid polyisocyanates containing carbodiimide groups, uretoneimines groups and/or isocyanurate rings, having isocyanate groups (NCO) contents of from 12 to 40 weight percent, more preferably from 20 to 35 weight percent, can also be used. These include, for example, polyisocyanates based on 4,4'— 2,4'— and/or 2,2'-diphenylmethane diisocyanate and the corresponding isomeric mixtures, 2,4— and/or 2,6-toluenediisocyanate and the corresponding isomeric mixtures; mixtures of diphenylmethane diisocyanates and PMDI; and mixtures of toluene diisocyanates and PMDI and/or diphenylmethane diisocyanates.

Generally, the amount of the isocyanate component may vary based on the actual requirement of the article to be prepared. For example, as one illustrative embodiment, the content of the isocyanate component can be from about 5 wt % to about 50 wt %, preferably from about 10 wt % to about 40 wt %, preferably from about 15 wt % to about 30 wt %, based on the total weight of all the components for preparing the prepolymer in the first stage, i.e., based on the total weight of the isocyanate component (A), the polyether polyol component (B), the optional component (C) if present and the optional catalyst (D) if present.

The Polyether Polyol Component (B)

Polyether polyols can be the addition polymerization products and the graft products of ethylene oxide, propylene oxide, tetrahydrofuran, and butylene oxide, the condensation products of polyhydric alcohols, and any combinations thereof. Suitable examples of the polyether polyols include, but are not limited to, polypropylene glycol (PPG), polyethylene glycol (PEG), polybutylene glycol, polytetramethylene ether glycol (PTMEG), and any combinations thereof. In some embodiments, the polyether polyols are the combinations of PEG and at least one another polyether polyol selected from the above described addition polymerization and graft products, and the condensation products. In some embodiments, the polyether polyols are the combinations of PEG and at least one of PPG, polybutylene glycol, and PTMEG.

The polyether polyol has a functionality (hydroxyl group, in a polyol molecule) of 2.0 to 3.0 and a weight average molecular weight (Mw) of 1,000 to 12,000 g/mol, preferably from 1,500 to 8,000 g/mol, more preferably from 1,500 to 6,000 g/mol.

The polyether polyols is generally prepared by polymerization of one or more alkylene oxides selected from propylene oxide (PO), ethylene oxide (EO), butylene oxide, tetrahydrofuran and mixtures thereof, with proper starter molecules in the presence of catalyst. Typical starter molecules include compounds having at least 2, preferably from 4 to 8 hydroxyl groups or having two or more primary amine groups in the molecule. Suitable starter molecules are for example selected from the group comprising aniline, EDA, TDA, MDA and PMDA, more preferably from the group comprising TDA and PMDA, an most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. By way of starter molecules having at least 2 and preferably from 2 to 8 hydroxyl groups in the molecule it is preferable to use trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Catalyst for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the polyether polyol includes copolymer of ethylene epoxide and propylene epoxide with primary hydroxyl ended group and secondary hydroxyl ended group.

The polyether polyol has an EO content of less than 80 wt %, preferably less than 60 wt %, more preferably less than 40 wt %, or even more preferably less than 20 wt % or 10 wt %, based on the total weight of the polyether polyol.

In general, the content of the polyether polyol used herein may range from about 50 wt % to about 95 wt %, preferably from about 60 wt % to about 85 wt %, based on the total weight of all the components for preparing the prepolymer in the first stage, i.e., based on the total weight of the isocyanate component (A), the polyether polyol component (B), the optional component (C) if present and the optional catalyst (D) if present.

The Optional Component (C)

The optional component (C) can be methoxy poly(ethylene glycol) with Mw ranging from 350~3000, poly(ethylene glycol) with Mw ranging from 350~3000 and low Mw diol with Mw ranging from 62 to 500.

The content of the methoxy poly(ethylene glycol) with Mw ranging from 350~3000 can be from about 0.5 wt % to about 10 wt %, preferably from about 0.8 wt % to about 8 wt %, preferably from about 1 wt % to about 4 wt %, based on the total weight of all the components for preparing the prepolymer in the first stage, i.e., based on the total weight of the isocyanate component (A), the polyether polyol component (B), the optional component (C) if present and the optional catalyst (D) if present.

The content of the low Mw diol can be from about 0.5 wt % to about 15 wt %, preferably from about 0.8 wt % to about 12 wt %, preferably from about 1 wt % to about 10 wt %, more preferably from about 2 wt % to about 8 wt %, based on the total weight of all the components for preparing the prepolymer in the first stage, i.e., based on the total weight of the isocyanate component (A), the polyether polyol component (B), the optional component (C) if present and the optional catalyst (D) if present. The low Mw diol can be ethylene glycol, 1,2-propanediol, 1,3-propanediol, 1,3-butanediol, 1,4-butenediol, 1,4-butynediol, 1,5-pentanediol, neopentyl— glycol, bis(hydroxy-methyl) cyclohexanes such as 1,4-bis(hydroxymethyl)cyclohexane, 2-methylpropane-1, 3-diol, methylpentanediols, diethylene glycol, triethylene glycol, tetraethylene glycol, polyethylene glycol, dipropylene glycol, polypropylene glycol, dibutylene glycol and polybutylene glycols. Commercial products like Voranol 220-530, Voranol TA425, Voranol P400, and Polyglycol P5000 from Dow Chemical.

The content of the poly(ethylene glycol) with Mw ranging from 350~3000 can be from about 0.5 wt % to about 10 wt %, preferably from about 0.8 wt % to about 8 wt %, preferably from about 1 wt % to about 4 wt %, based on the total weight of all the components for preparing the prepolymer in the first stage, i.e., based on the total weight of the isocyanate component (A), the polyether polyol component (B), the optional component (C) if present and the optional catalyst (D) if present.

Catalyst (D)

Catalyst may include any substance that can promote the reaction between the isocyanate group and the isocyanate-reactive group. Without being limited to theory, the catalysts can include, for example, glycine salts; tertiary amines; tertiary phosphines, such as trialkylphosphines and dialkyl-benzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethyl-hexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl— diethylene triamine, bis(2-dimethylaminoethyl) ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethylamino-methyl) phenol, N,N',N"-tris(dimethyl amino-propyl)sym-hexahydro triazine, or mixtures thereof.

In general, the content of the catalyst used herein is larger than zero and is at most 1.0 wt %, preferably at most 0.5 wt %, more preferably at most 0.05 wt %, based on the total weight of all the components for preparing the prepolymer in the first stage, i.e., based on the total weight of the isocyanate component (A), the polyether polyol component (B), the optional component (C) if present and the optional catalyst (D) if present.

Prepolymer

The isocyanate component (A), the polyether polyol component (B), the optional component (C) if present and the optional catalyst (D) if present are reacted to form a prepolymer.

According to an embodiment of the present disclosure, the prepolymer has a NCO content of 1.5 wt % to 15 wt %, preferably, 2 wt % to 12 wt %, more preferably, 3 wt % to 10 wt % still more preferably, 4 wt % to 9 wt %, based on the weight of the prepolymer.

Hydrophilic Amino Siloxane compound (E)

The hydrophilic amino siloxane compound is a compound comprising a silicon-oxygen back bone chain to which nitrogen-containing side chain and hydrophilic side chain are attached. The molecular structure of the hydrophilic amino siloxane compound may be represented by Formula I:

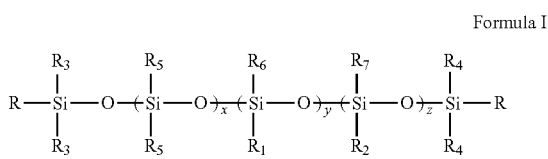

Formula I wherein each R independently represents methyl, ethyl, n-propyl, i-propyl, n-butyl, i-butyl, s-butyl, t-butyl, n-pentyl, i-pentyl, tert-pentyl, neo-pentyl, cyclohexyl, phenyl, vinyl, allyl or —(OCH$_2$CH$_2$)$_a$—O—CH$_2$—CH=CH$_2$;

R$_1$ is —(CH$_2$)$_m$NH$_2$ or —(CH$_2$)$_s$—NH—(CH$_2$)$_t$NH$_2$;

R$_2$ is —CH$_2$CH$_2$CH$_2$O(CH$_2$CH$_2$O)$_n$H; and each of R$_3$, R$_4$, R$_5$, R$_6$ and R$_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl and phenyl;

wherein a is an integer of 1 to 10; x is an integer of 20-200; y is an integer of 1-10; z is an integer of 1-10; m is an integer of 1-5; s is an integer of 1, 2, 3, 4 or 5; t is an integer of 1, 2, 3, 4 or 5; and n is an integer of 5-20.

Without being limited to theory, the amine group in R$_1$ and the hydroxyl group in R$_2$ may react with the remaining isocyanate group in the prepolymer to produce a polyurethane comprising the above siloxane structure in the polyurethane back bone chain, thus significantly improve the anti-stickiness of the resultant PU skin film.

According to one preferable embodiment of the present disclosure, the hydrophilic amino siloxane compound has a structure presented by Formula II:

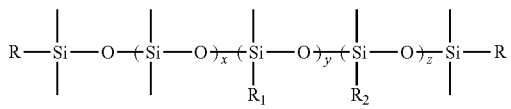

wherein R, R$_1$, R$_2$, x, y and z are as described above.

In general, the hydrophilic amino siloxane compound is an optional component, that is, it can be used or not. If it is present, the content of the hydrophilic amino siloxane compound used herein is from 0.1 wt % to 10 wt %, preferably from 1 wt % to 8 wt %, more preferably from 2 wt % to 5 wt %, based on the total weight of all the components for preparing the prepolymer in the first stage, i.e., based on the total weight of the isocyanate component (A), the polyether polyol component (B), the optional component (C) if present and the optional catalyst (D) if present. It can be seen that the content of the hydrophilic amino siloxane compound is calculated as an additional amount while taking the total amount of the prepolymer as 100 wt %.

It's noted that the hydrophilic amino siloxane compound should be firstly dissolved/dispersed in water via mixing to get an aqueous solution and then degassed. In this invention, the amino silicone oil was added during the dispersion stage and was not added into polymer backbone during the prepolymer synthesis. The reason is that some degree of polymer gel will be formed if the siloxane was added during the prepolymer synthesis stage.

The amount of hydrophilic amino siloxane compound can be about 0.05 wt % to about 2 wt % based on the total weight of the polyurethane dispersion, more preferably, 0.1 wt % to about 1.5 wt % based on the total weight of the polyurethane dispersion.

Surfactant (F)

According to a preferable embodiment, the waterborne polyurethane dispersion is an externally emulsified dispersion, i.e., the waterborne polyurethane dispersion is preferably prepared exclusively by using "external surfactant/emulsifier" and substantially comprises no "internal surfactant/emulsifier".

The expression "externally emulsified polyurethane dispersion" as described herein refers to a polyurethane dispersion comprising limited amount of internally emulsifying ionic components and thus mainly relying on the emulsifying function of "external surfactant/emulsifier" [i.e. ionically or nonionically emulsifiers that are not covalently bonded to the backbone chain within the polyurethane particles dispersed in the liquid medium, especially via the urethane bond derived from the reaction between an isocyanate group and an isocyanate-reactive group (such as a hydroxyl group)] so as to stabilize the polyurethane dispersion.

According to one embodiment of the present disclose, the externally emulsified polyurethane dispersion is prepared by (i) reacting one or more monomeric or prepolymeric polyisocyanates with one or more compounds having at least two isocyanate-reactive groups as stated above to form a prepolymer comprising an urethane prepolymer chain and at least one, preferably at least two free isocyanate groups per molecule; (ii) dispersing the prepolymer obtained in step (i) in an aqueous solvent (e.g. water) with the presence of the external emulsifier to form an emulsion and optionally further adding the chain extender and the optional hydrophilic amino siloxane compound into the emulsion to react with the prepolymer obtained in step (i) and form the externally emulsified polyurethane dispersion. According to one embodiment of the present disclosure, the prepolymer prepared in the step (i) does not comprise any ionic internal emulsifier or residual moieties of the ionic internal emulsifier covalently bonded to the urethane prepolymer chain. According to another embodiment of the present disclosure, the polyurethane chain in the prepolymer prepared in the step (i) does not comprise any cationic or anionic pendant group.

The PUD prepared by using an internal surfactant/emulsifier is known as an "internally emulsified PUD". According to the knowledge of the prior art, a typical process for preparing an internally emulsified PUD comprises the steps of (i) reacting an monomeric isocyanate or a prepolymer of the monomeric isocyanate with polyols and cationic or anionic precursor which has at least one isocyanate-reactive groups (i.e., an ionic internal emulsifier) to form a PUD prepolymer comprising pendant cationic or anionic hydrophilic groups attached to the PU chain; (ii) dispersing the PUD prepolymer into an aqueous solvent (e.g. water), with the cationic or anionic hydrophilic group attached to the PU chain as main emulsifier, optionally with the assistance of additional external emulsifier in this step; and optionally (iii) reacting the emulsion with additional chain extender to form the ionic internally emulsified polyurethane dispersion. It can be clearly seen that the externally emulsified PUD used in the present disclosure is completely different from the ionic internally emulsified PUD of the prior art both in the preparation process and the composition of the resultant polyurethane particles. It shall be clarified that the polyurethane particles prepared by the present application comprise residual groups of the chain extenders and the hydrophilic amino siloxane compound attached to the polyurethane main chain, but these residual groups are different from the above stated ionic internal emulsification function groups at least in the charge neutrality and hence shall be excluded from the definition of the ionic internal emulsifying function groups. Besides, in a preferable embodiment, the emulsifying of the polyurethane is conducted mainly or solely by using the external emulsifier, and the chain extender and hydrophilic amino siloxane compound are not added until an emulsion of PU has been formed. That is why the PU dispersion of the present disclosure is identified as an externally emulsified system.

In one embodiment of the present disclosure, the above stated ionic internal emulsifying component (emulsifier) is not added during the preparation of the externally emulsified PUD. In a preferable embodiment of the present disclosure, the externally emulsified polyurethane dispersion is free of anionic or cationic salt group in the backbone chain of the polyurethane prepolymer particles dispersed in the externally emulsified PUD.

The waterborne polyurethane dispersion of the present disclosure may be prepared by using any anionic surfactant, cationic surfactant, amphoteric surfactant or non-ionic surfactant. Suitable classes of surfactant include, but are not restricted to, sulfates of ethoxylated phenols such as poly (oxy-1,2-ethanediyl)α-sulfo-ω(nonylphenoxy) salt; alkali metal fatty acid salts such as alkali metal oleates and stearates; alkali metal $C_{12}$-$C_{16}$ alkyl sulfates such as alkali metal lauryl sulfates; amine $C_{12}$-$C_{16}$ alkyl sulfates such as amine lauryl sulfates, more preferably triethanolamine lauryl sulfate; alkali metal $C_{12}$-$C_{16}$ alkylbenzene sulfonates such as branched and linear sodium dodecylbenzene sulfonates; amine $C_{12}$-$C_{16}$ alkyl benzene sulfonates such as triethanolamine dodecylbenzene sulfonate; anionic and non-ionic fluorocarbon emulsifiers such as fluorinated $C_4$-$C_{16}$ alkyl esters and alkali metal $C_4$-$C_{16}$ perfluoroalkyl sulfonates; organosilicon emulsifiers such as modified polydimethylsiloxanes. Preferably, the surfactant is one that can react with a multivalent cation present in a neutral salt to form an insoluble multivalent cation water insoluble salt of an organic acid. Exemplary preferred surfactant includes disodium octadecyl sulfosuccinate, sodium dodecylbenzene sulfonate, sodium stearate and ammonium stearate.

According to an embodiment of the present disclosure, the content of the surfactant is larger than zero, preferably no less than 0.5 wt %, preferably no less than 1 wt %, and no more than 10 wt %, preferably no more than 6 wt %, more preferably no more than 3.5 wt %, based on the total weight of all the components for preparing the prepolymer in the first stage, i.e., based on the total weight of the isocyanate component (A), the polyether polyol component (B), the optional component (C) if present and the optional catalyst (D) if present. It can be seen that the content of the surfactant is calculated as an additional amount while taking the total amount of the prepolymer as 100 wt %.

According to an embodiment of the present disclosure, the weight ratio of the surfactant to the prepolymer is 1:100 to 6:100, preferably 1.5:100 to 5:100, preferably 2:100 to 4:100.

Chain Extender (G)

According to one embodiment of the present disclosure, the chain extender is N-aminoethylpiperazine.

According to an embodiment of the present disclosure, the content of the chain extender is from 1.0 wt % to 20 wt %, preferably from 2 wt % to 15 wt %, more preferably from 3 wt % to 12 wt %, more preferably from 4 wt % to 11 wt %, based on the total weight of all the components for preparing the prepolymer in the first stage, i.e., based on the total weight of the isocyanate component (A), the polyether polyol component (B), the optional component (C) if present and the optional catalyst (D) if present. It can be seen that the content of the chain extender is calculated as an additional amount while taking the total amount of the prepolymer as 100 wt %.

According to an embodiment of the present disclosure, the molar ratio of the chain extender N-aminoethylpiperazine to NCO in the prepolymer is 0.05:1 to 0.5:1, preferably 0.1:1 to 0.48:1, preferably 0.2:1 to 0.45:1.

The Waterborne Polyurethane Dispersion

According to an embodiment of the present application, the waterborne polyurethane dispersion is prepared by a two-stage reaction.

In the first stage, a prepolymer is prepared by reacting the isocyanate groups in the isocyanate component (A) with the isocyanate-reactive groups in the polyether polyol component (B) and the optional component (C) optionally in the presence of the catalyst (D). A polyurethane back bone chain can be formed in the prepolymer by the above stated reaction.

In the second stage, the prepolymer is dispersed in water in the presence of the surfactant (F) to get an emulsion, which reacts with the chain extender (G) and the optional hydrophilic amino siloxane compound (E). The chain extender (G) and the hydrophilic amino siloxane compound (E) comprise isocyanate-reactive groups, e.g. amine group, which can later react with the free isocyanate groups remained in the prepolymer, hence their structural moieties are also introduced into the resultant polyurethane back bone chain. In the third stage, the chain of the prepolymer is further extended by the chain extender (G) and the optional hydrophilic amino siloxane compound (E) so as to form the waterborne polyurethane dispersion comprising polyurethane particles dispersed in water. The waterborne polyurethane dispersion may be heated and dried to form a film exhibiting a superior hydrolysis resistance and improved PUD film mechanical properties.

The waterborne polyurethane dispersion may have any suitable solids loading of polyurethane particles, but the solids loading is generally between about 1% to about 70% solids by weight of the total dispersion weight, preferably at least about 2%, more preferably at least about 4%, more preferably at least about 6%, more preferably at least about 15%, more preferably at least about 25%, more preferably at least about 35%, most preferably at least about 40%, to at most about 70%, preferably at most 68%, more preferably at most about 65%, and most preferably at most about 60% by weight.

The waterborne polyurethane dispersion may also contain a rheological modifier such as thickeners that enhance the dispersability and stability of the dispersion. Any suitable rheological modifier may be used such as those known in the art. Preferably, the rheological modifier is one that does not cause the dispersion to become unstable. More preferably, the rheological modifier is a water soluble thickener that is not ionized. Examples of useful rheological modifiers include methyl cellulose ethers, alkali swellable thickeners (e.g., sodium or ammonium neutralized acrylic acid polymers), hydrophobically modified alkali swellable thickeners (e.g., hydrophobically modified acrylic acid copolymers) and associative thickeners (e.g., hydrophobically modified ethylene-oxide-based urethane block copolymers). Preferably the rheological modifier is a methylcellulose ether. The amount of thickener is from at least about 0.2% to about 5% by weight of the total weight of the waterborne polyurethane dispersion, preferably from about 0.5% to about 2% by weight.

Generally, the waterborne polyurethane dispersion has a viscosity from at least about 10 cp to at most about 10,000 cp, preferably, from at least about 20 cp to at most about 5000 cp, more preferably, from at least about 30 cp to at most about 3000 cp.

In an embodiment of the present disclosure, the dispersion of the PU particles in the waterborne polyurethane dispersion can be promoted by the surfactant and high shear stirring action, wherein the shear force and stirring speed can be properly adjusted based on specific requirement.

According to one embodiment of the present disclosure, the waterborne polyurethane dispersion may further comprise one or more antifoam additives.

Examples of antifoam additives may include mineral oil based ones, like Airase 4500 and TEGO Antifoam 2263, FoamStar ST2410, or organo modified siloxanes, like TEGO Antifoam D2315, TEGO Antifoam 4-88, TEGO Antifoam 1488, DOWSIL AFE-7610, XIAMETER AFE-2210, DOWSIL 112F additive, DOWSIL 62 additive. The amount of the antifoam additives may be 0.001% to 5%, preferably 0.005-2%, more preferably 0.01% to 0.5% by weight, based on the total weight of the waterborne polyurethane dispersion.

EXAMPLES

Some embodiments of the invention will now be described in the following Examples, wherein all parts and percentages are by weight unless otherwise specified.

The information of the raw materials used in the examples is listed in the following table 1:

Raw Materials

The raw materials and components used in the invented composite are list in Table 1.

TABLE 1

| Raw Materials used in this invention | | |
| --- | --- | --- |
| Raw Material | Description | Supplier |
| Isophorone diisocyanate (IPDI) | Aliphatic isocyanate, functionality = 2 | Evonik |
| 4,4'-methylene diphenyl diisocyanate (4,4-MDI) | Aromatic diisocyanate, functionality = 2 | Dow Chemical |
| Dabco ™ T120 | Catalyst (organic tin) | Evonik |
| Voranol ™ 9287A Polyol | Polyether polyol, Mw = 2000, EO capped, EO content = 12 wt. %, Functionality = 2 | Dow |
| MPEG1000 | Mw = 1000, Functionality = 1 | Sinopharm. |
| N-Aminoethylpiperazine (AEP) | diamine chain extender | Sinopharm. |
| Amino ethyl ethanol amine (AEEA) | diamine chain extender | Sinopharm. |
| Ethylene diamine (EDA) | diamine chain extender | Sinopharm. |
| Piperazine (68%) (PIP68) | diamine chain extender | Dow |
| Sodium dodecyl benzene sulfonate (SDBS) | Surfactant | Sinopharm. |

Inventive Example 1

1) Prepolymer A synthesis:
In a 250 ml flask, equipped with mechanical stirring and Nitrogen purging, Voranol 9287 A (70 g) and MPEG1000 (2 g) were charged, and dehydrated at 110° C. under −76 mmHg vacuum for one hour. After cooled down to 70-75° C., IPDI (28 g) was loaded into the polyol mixture with stirring, then Dabco™ T-120 catalyst (0.03 g) was added into the reactants. The reaction lasted for one hour at 70-75° C., and then was heated to 80-85° C. for additional 2-3 hours to complete the reaction. The resulting prepolymer A was cooled down and packaged with nitrogen protection. NCO% was measured by titration as 7.3 wt %.

2) PUD synthesis:
In a 500 ml plastic cup, equipped with Cowels Blade mixer, prepolymer A (100 g) was loaded. While mixing at 4000 rpm speed, 13 g SDBS aqueous solution (23 wt %) was added into the prepolymer, and mixed for 2 min. Then 40 g icy water was added into the mixture for further 5 min mixing to conduct a phase reversion. The mixing speed was slowed down to 1500 rpm, 31.8 g icy water was added, followed with the addition of 96.9 g N-aminoethylpiperazine (AEP) 10% aqueous solution (to react with 90% NCO in the prepolymer). The mixture was mixed for additional 10 min to get a final PUD with a solid content of 40%.

3) Film formation and Instron test:
11 g PUD was diluted with 11 g D.I. water, mixed and degassed under vacuum. It was then poured into a plastic petri dish, and put into 48° C. oven. After 24 hrs, the dried film was peeled off, turned upside down for another 24 hrs heating in oven. The film was conditioned at room temperature for 24 hrs before the instron test. The film was cut into specimens for tensile testing according to ASTM D412-15a. The testing was conducted at a speed of 50 mm/min. Three specimens were tested for each sample to get average data. The mean tensile modulus at 100% elongation was 5.11 Mpa, with a standard deviation of 0.26 Mpa. The mean tensile elongation at break was 640.7%, with a standard deviation of 12.7%. The mean tensile strength was 28.91 Mpa, with a standard deviation of 2.19 Mpa.

Comparative example 1

Comparative example 1 was the same as what was described in Inventive example 1, except that after phase reversion in PUD synthesis, 70.65 icy water was added, followed with the addition of 45.1 g ethylene diamine (EDA) 10% aqueous solution (to react with 90 mol% NCO in the prepolymer) for chain extension. The mean tensile modulus at 100% elongation was 2.07 Mpa, with a standard deviation of 0.08 Mpa. The mean tensile elongation at break was 774.85%, with a standard deviation of 110.1%. The mean tensile strength was 20.09 Mpa, with a standard deviation of 7.65 Mpa.

Comparative example 2

Comparative example 2 was the same as what was described in Inventive example 1, except that after phase reversion in PUD synthesis, 44.8 g icy water was added, followed with the addition of 79.6 g aminoethyl ethanol amine (AEEA) 10% aqueous solution (to react with 91.6 mol% NCO in the prepolymer) for chain extension. The mean tensile modulus at 100% elongation was 1.48 Mpa, with a standard deviation of 0.21 Mpa. The mean tensile elongation at break was 1012.02%, with a standard deviation of 86.77%. The mean tensile strength was 20.03 Mpa, with a standard deviation of 4.43 Mpa.

Comparative example 3

Comparative example 3 was the same as what was described in Inventive example 1, except that after phase reversion in PUD synthesis, 55 g icy water was added, followed with adding 65.8 g piperazine (PIP) 10% aqueous solution (to react with 91.66 mol% NCO in the prepolymer) for chain extension.

The mean tensile modulus at 100% elongation was 3.75 Mpa, with a standard deviation of 0.63 Mpa. The mean tensile elongation at break was 783.34%, with a standard deviation of 93.69%. The mean tensile strength was 22.86 Mpa, with a standard deviation of 5.77 Mpa.

Inventive Example 2

1) Prepolymer B synthesis:

In a 250 ml flask, equipped with mechanical stirring and Nitrogen purging, 68 g Voranol 9287 A and 2 g MPEG 1000 were charged and dehydrated at 110° C. under vacuum for one hour, then cooled down to 70-75° C. 30 g 4,4-MDI was added into the dehydrated blend polyols. The flask temperature was kept at 70~75° C. for 1 hr, and then raised to 80-85° C., kept for 2-3 hours to complete the reaction. The resulting prepolymer B was cooled down and packaged with nitrogen protection. NCO% was measured by titration as 7.1 wt %.

2) PUD synthesis:

In a 500 ml plastic cup, equipped with Cowels Blade mixer, prepolymer B (100 g) was loaded. While mixing with 4000 rpm speed, 13 g SDBS 23 wt % aqueous solution was added into the prepolymer, and mixed for 30 sec. Then 75 g icy water was added into the mixture for further 5 min mixing to conduct a phase reversion. The mixing speed was slowed down to 1500 rpm, 53.3 g icy water and 21.54 g N-aminoethylpiperazine (AEP) 20% aqueous solution (to react with 40 mol% NCO in the prepolymer) were poured into the mixture. The mixture was mixed for additional 2 min to get a final PUD with a solid content of 40%. The PUD was placed for 2 day to complete the reaction of water with the rest of NCO.

3) Film formation and Instron test:

The film formation and Instron test followed the sample procedure described in Inventive example 1. The mean tensile modulus at 100% elongation was 4.69 Mpa, with a standard deviation of 0.62 Mpa. The mean tensile elongation at break was 581.5%, with a standard deviation of 8.76%. The mean tensile strength was 28.65 Mpa, with a standard deviation of 4.18 Mpa.

Comparative Example 4

Comparative example 4 was the same as what was described in Inventive example 2, except that after phase reversion in PUD synthesis, 56.43 g icy water and 17.4 g 20% AEEA solution (to react with 40 mol% NCO in the prepolymer) were poured into the mixture. Film formation and Intron test followed the same procedure. The mean tensile modulus at 100% elongation was 1.61 Mpa, with a standard deviation of 0.06 Mpa. The mean tensile elongation at break was 790.9%, with a standard deviation of 7.71%. The mean tensile strength was 18.78 Mpa, with a standard deviation of 0.27 Mpa.

The film performance data were summarized in Table 2.

TABLE 2

|  | Inventive Example 1 | Comparative Example 1 | Comparative Example 2 | Comparative Example 3 | Inventive Example 2 | Comparative Example 4 |
| --- | --- | --- | --- | --- | --- | --- |
| Prepolymer type | Aliphatic | Aliphatic | Aliphatic | Aliphatic | Aromatic | Aromatic |
| Diamine Chain Extender | AEP | EDA | AEEA | PIP | AEP | AEEA |
| Stio. Mol % of NCO reacted with diamine | 90 | 90 | 91.4 | 91.66 | 40 | 40 |
| Modulus (Secant 100%)(Mpa) | 5.11 | 2.07 | 1.48 | 3.75 | 4.69 | 1.61 |
| Tensile elongation at break (%) | 640.69 | 774.85 | 1012.02 | 783.34 | 581.5 | 790.85 |
| Tensile stress (Mpa) | 28.91 | 20.09 | 20.03 | 22.86 | 28.65 | 18.78 |

Inventive Example 3, and Comparative Example 5-11

In a 10 ml glass bottle, a certain amount of D.I. water was weighed, followed by a chain extender. The recipe was in provided in Table 3. The bottle was capped and shaken manually for a homogenous, clear, and transparent solution. It was put at room temperature (25° C.) for 60 min, and the appearance was recorded. It was then put into a refrigerator at a temperature of 4° C. for 60 min, and taken out, and the appearance was checked.

For piperazine (PIP68), it contained 32% water and was a solid at room temperature. The chemical was put into a 60° C. oven to be melted into liquid, and then weighed into 10 ml glass bottle with water in it. It was capped and manually shaken immediately right after weighing for a homogeneous, clear and transparent solution right after mixing (still warm by then).

The appearance was recorded in Table 3.

TABLE 3

|  | AEP | EDA | AEEA | piperazine (68%) | D.I. water | Chain extender wt % | Appearance at R.T. | Appearance at 4 deg C. |
|---|---|---|---|---|---|---|---|---|
| IE 3 | 3.98 |  |  |  | 6.03 | 39.76 | Clear | Clear |
| CE 5 |  | 3.99 |  |  | 6.01 | 39.9 | Clear | Clear |
| CE 6 |  |  | 4.01 |  | 6.01 | 40.02 | Clear | Clear |
| CE 7 |  |  |  | 1.47 | 8.53 | 10.00 | Clear | Precipitate |
| CE 8 |  |  |  | 2.21 | 7.74 | 15.10 | Clear | Precipitate |
| CE 9 |  |  |  | 2.94 | 7.07 | 19.97 | Precipitate |  |
| CE 10 |  |  |  | 3.68 | 6.30 | 25.06 | Precipitate |  |
| CE 11 |  |  |  | 4.41 | 5.61 | 29.93 | Precipitate |  |

From Table 2 and 3, it is surprisingly found that AEP can give PUD higher modulus than other diamines. Such high modulus is very critical for polyether PUD to penetrate into applications dominated by polyester PUD. As polyether PUD intrinsically has superior hydrolysis stability to polyester PUD, this novel finding paves the way for commercial offering of hydrolysis-resistant PUDs. Piperazine can also give relatively poor modulus, and its solubility is very limited, easy to precipitate while being cooled down during PU dispersing process. In contrast, AEP is liquid at room temperature (its Mp is −19° C.), and fully miscible with water, its processability is much better than piperazine.

What is claimed is:

1. A waterborne polyurethane dispersion comprising polyurethane particles dispersed in water, wherein the waterborne polyurethane dispersion is derived from a system consisting essentially of:
   (A) an isocyanate component comprising one or more compounds having at least two isocyanate groups;
   (B) a polyether polyol component having an EO content of less than 80 wt % based on the total weight of the polyether polyol;
   (C) optionally, a component selected from the group consisting of methoxy poly(ethylene glycol) with Mw ranging from 350~3000, poly(ethylene glycol) with Mw ranging from 350~3000, and low Mw diol with Mw ranging from 62 to 500;
   (D) optionally, a catalyst;
   (E) optionally, a hydrophilic amino siloxane compound represented Formula I:

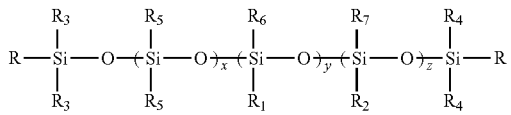

Formula I wherein each R independently represents methyl, ethyl, n-propyl, i-propyl, n-butyl, i-butyl, sec-butyl, t-butyl, n-pentyl, i-pentyl, tert-pentyl, neo-pentyl, cyclohexyl, phenyl, vinyl, allyl or —(OCH$_2$CH$_2$)$_a$—O—CH$_2$—CH=CH$_2$;
$R_1$ is —(CH$_2$)$_m$NH$_2$ or —(CH$_2$)$_s$—NH—(CH$_2$)$_t$NH$_2$;
$R_2$ is —CH$_2$CH$_2$CH$_2$O(CH$_2$CH$_2$O)$_n$H; and
each of $R_3$, $R_4$, $R_5$, $R_6$ and $R_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl and phenyl;

wherein a is an integer of 1 to 10; x is an integer of 20-500; y is an integer of 1-10; z is an integer of 1-10; m is an integer of 1-5; s is an integer of 1, 2, 3, 4 or 5; t is an integer of 1, 2, 3, 4 or 5; and n is an integer of 5-20;
   (F) a surfactant;
   (G) a chain extender N-aminoethylpiperazine; and
   (H) water.

2. The waterborne polyurethane dispersion according to claim 1, wherein there is no cationic or anionic hydrophilic pendant groups or groups which can be converted into the cationic or anionic hydrophilic pendant groups covalently attached to the backbone chain of polyurethane in the polyurethane particles, and the polyurethane is externally emulsified.

3. The waterborne polyurethane dispersion according to claim 1, wherein the one or more compounds having at least two isocyanate groups are selected from the group consisting of:
   a) C4-C12 aliphatic polyisocyanates comprising at least two isocyanate groups, C6-C15 cycloaliphatic or aromatic polyisocyanates comprising at least two isocyanate groups, C7-C15 araliphatic polyisocyanates comprising at least two isocyanate groups, and a combination thereof; and
   b) an isocyanate prepolymer prepared by reacting one or more polyisocyanates of a) with one or more isocyanate-reactive components selected from the group consisting of C2-C16 aliphatic polyhydric alcohols comprising at least two hydroxy groups, C6-C15 cycloaliphatic or aromatic polyhydric alcohols comprising at least two hydroxy groups, C7-C15 araliphatic polyhydric alcohols comprising at least two hydroxy groups, polyester polyols having a molecular weight from 500 to 5,000, polycarbonate diols having a molecular weight from 200 to 5,000, polyetherdiols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, and a combination thereof, with the proviso that the isocyanate prepolymer comprises at least two free isocyanate terminal groups.

4. The waterborne polyurethane dispersion according to claim 1,
wherein the content of the isocyanate component (A) is from 5 wt % to 50 wt %, based on the total weight of the isocyanate component (A), the polyether polyol component (B), the optional component (C) if present and the optional catalyst (D) if present.

5. The waterborne polyurethane dispersion according to claim 1, wherein the polyether polyol has an EO content of less than 60 wt % based on the total weight of the polyether polyol.

6. The waterborne polyurethane dispersion according to claim 1, wherein the content of the polyether polyol ranges from 50 wt % to 95 wt %, based on the total weight of the isocyanate component (A), the polyether polyol component (B), the optional component (C) if present and the optional catalyst (D) if present.

7. The waterborne polyurethane dispersion according to claim 1, wherein the catalyst (D) is selected from the group consisting of: organotin compound, organic bismuth compound, tertiary amine, morpholine derivative, piperazine derivative, and combination thereof; and
wherein the content of the catalyst (D) is 1.0 wt % or less, based on the total weight of the isocyanate component (A), the polyether polyol component (B), the optional component (C) if present and the optional catalyst (D) if present.

8. The waterborne polyurethane dispersion according to claim 1,
wherein the surfactant (F) is selected from the group consisting of: poly(oxy-1,2-ethanediyl) α-sulfo-ω(nonylphenoxy) salt, alkali metal oleates and stearates, alkali metal $C_{12}$-$C_{16}$ alkyl sulfates, amine $C_{12}$-$C_{16}$ alkyl sulfates, alkali metal $C_{12}$-$C_{16}$ alkyl benzene sulfonates, amine $C_{12}$-$C_{16}$ alkyl benzene sulfonates, fluorinated $C_4$-$C_{16}$ alkyl esters, alkali metal $C_4$-$C_{16}$ perfluoroalkyl sulfonates, and the combination thereof; and
wherein the content of the surfactant (F) is larger than 0% and no more than 10 wt %, based on the total weight of the isocyanate component (A), the polyether polyol component (B), the optional component (C) if present and the optional catalyst (D) if present.

9. The waterborne polyurethane dispersion according to claim 1, wherein the content of the chain extender (G) is from 1.0 wt % to 20 wt %, based on the total weight of the isocyanate component (A), the polyether polyol component (B), the optional component (C) if present and the optional catalyst (D) if present.

10. The waterborne polyurethane dispersion according to claim 1, wherein the content of the hydrophilic amino siloxane compound (E) is from 0.1 wt % to 10 wt % based on the total weight of the isocyanate component (A), the polyether polyol component (B), the optional component (C) if present and the optional catalyst (D) if present.

11. A method for preparing the waterborne polyurethane dispersion according to claim 1, the method comprising
(i) reacting the isocyanate component (A) with the polyether polyol component (B) and the optional component (C) optionally in the presence of the catalyst (D) to form a prepolymer;
(ii) dispersing the prepolymer in water (H) in the presence of the surfactant (F) to form an emulsion; and
(iii) adding optionally the hydrophilic amino siloxane compound (E) and the chain extender N-aminoethylpiperazine (G) to the emulsion to form the waterborne polyurethane dispersion.

12. The method of claim 11, wherein the prepolymer has a NCO content of 1.5 wt % to 15 wt % based on the weight of the prepolymer.

* * * * *